United States Patent [19]

Freund

[11] Patent Number: 5,718,559

[45] Date of Patent: Feb. 17, 1998

[54] APPARATUS FOR THE REMOVAL AND TRANSFER OF PLATE-SHAPED OBJECTS FROM A STACK USING A SUCTION DEVICE

[75] Inventor: Michael Freund, Schorndorf, Germany

[73] Assignee: Eastman Kodak Company, Rochester, N.Y.

[21] Appl. No.: 752,187

[22] Filed: Nov. 18, 1996

[30] Foreign Application Priority Data

Nov. 30, 1995 [DE] Germany .......... 195 44 684.4

[51] Int. Cl.$^6$ .............................................. B65G 59/04
[52] U.S. Cl. .................. 414/797; 294/64.1; 414/908
[58] Field of Search ........................ 294/64.1; 414/27, 414/797, 908; 221/211

[56] References Cited

U.S. PATENT DOCUMENTS

| | | | |
|---|---|---|---|
| 412,446 | 8/1889 | Allen ............... | 294/64.1 X |
| 3,711,142 | 1/1973 | Wolski ............. | 294/64.1 |
| 5,201,913 | 4/1993 | Vliet ................ | 294/64.1 |
| 5,282,659 | 2/1994 | Yasuraoka et al. .. | 294/64.1 X |
| 5,549,340 | 8/1996 | Nagai et al. ....... | 294/64.1 |

FOREIGN PATENT DOCUMENTS

| | | | |
|---|---|---|---|
| 0067073 | 12/1982 | European Pat. Off. ...... | B65B 5/04 |
| 1230461 | 9/1960 | France ............... | 294/64.1 |
| 656949 | 4/1979 | U.S.S.R. ............. | 294/64.1 |

*Primary Examiner*—Janice L. Krizek
*Attorney, Agent, or Firm*—Raymond L. Owens

[57] ABSTRACT

The invention relates to a device for the removal and transfer of plate-shaped objects (CD) from a stack using a suction device being movable against a counter-force for generating a vacuum with a predetermined duration at a suction opening. To obtain a simple, compact and inexpensive design with safe, simple and gentle removal and transfer of plate-shaped objects such as ring disks or information carriers (compact disks, diskettes or floppy disks) in an automated environment, the device has two U-shaped hollow elements in a concentric arrangement that are on the one hand slideable towards and into one another with their open ends and on the other hand are substantially airtightly sealed in their movement range in relation to one another to the extent that when a vacuum is generated a leak flow of predetermined size and course is achievable, and hence also the vacuum duration that is predetermined for the removal of the object. Furthermore, a sensor device having a sensor, scanning marks and receiving device provided with two pivot-in holding elements for a plate-shaped object (CD) picked up by the suction device from the top of a stack are also provided.

14 Claims, 5 Drawing Sheets

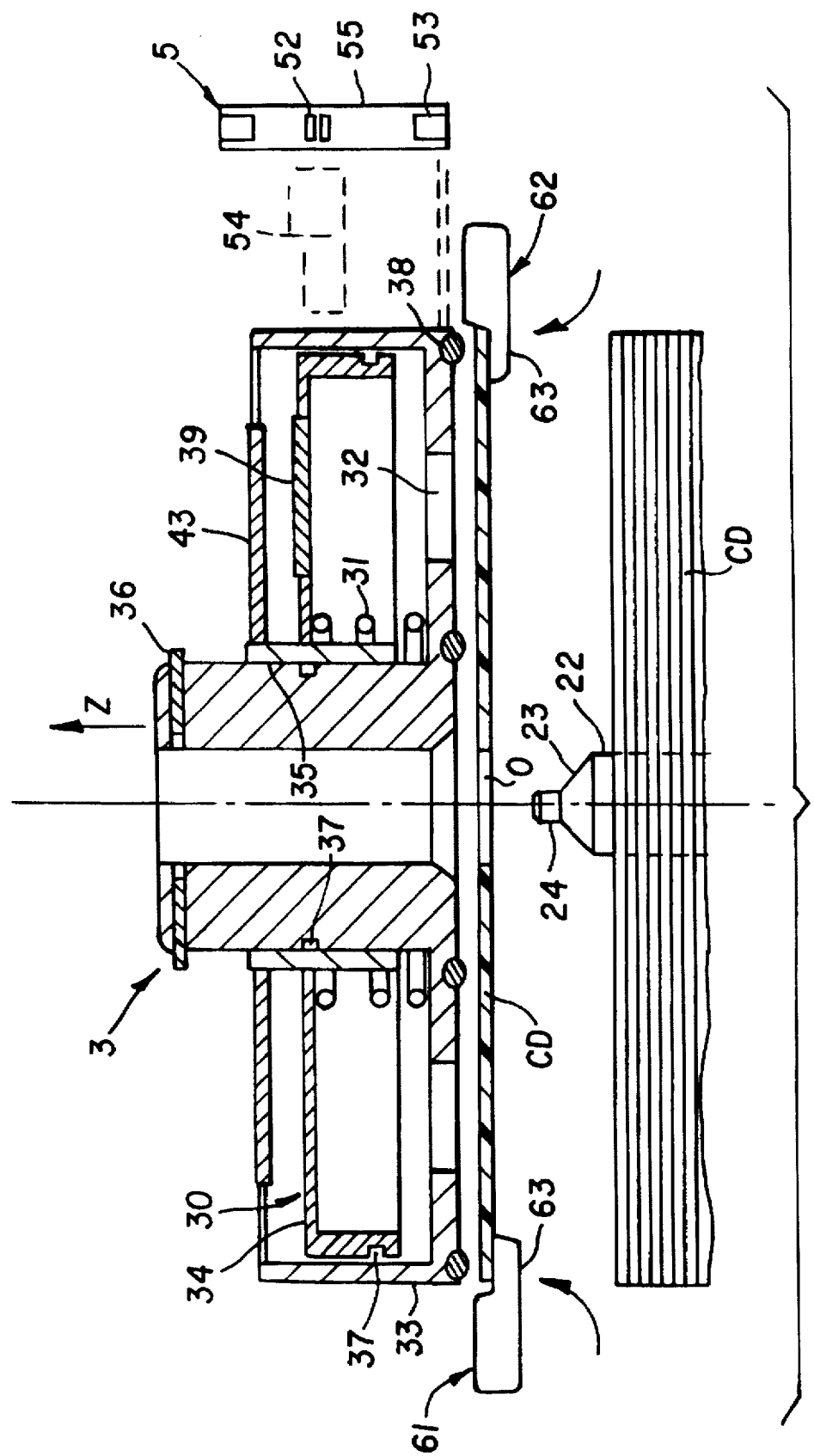

APPARATUS FOR THE REMOVAL AND TRANSFER OF PLATE-SHAPED OBJECTS FROM A STACK USING A SUCTION DEVICE

FIELD OF THE INVENTION

The invention relates to an apparatus for the removal and transfer of plate-shaped objects from a stack using a suction device.

Apparatus of the above type are known that serve to remove and transfer plate-shaped objects, such as information carriers (compact disks, floppy disks, diskettes or records).

BACKGROUND OF THE INVENTION

An apparatus of this type is known from EP-B-0 067 073 for removal and transfer of plate-shaped information carriers, in particular compact disks (CDs), from a stack, having a suction device with means containing two bellows units made of an elastic material. To remove a CD, the bellows units are lowered using a lifting and transfer device onto the topmost CD of a stack held by a shaft of a stack magazine, pressed together and then lifted. When the bellows units are pressed together in order to generate the suction vacuum, their air is expelled and escapes between a sealing lip provided on the suction opening and the CD surface. Air supply into the bellows units in order to release the picked-up CD is achieved by opening a valve connected to the bellows units. Drawbacks here are on the one hand the expensive design of the suction device, due to the additional valve and the necessary control system plus the use of two bellows units, and on the other hand the uncertain handling of the CD during removal and transfer, since the CD is picked up and held using the bellows-type suction devices only at two relatively small suction points.

SUMMARY OF THE INVENTION

The object underlying the present invention is to create an apparatus of the generic type on the one hand having a simple, compact and inexpensive design, and on the other hand ensuring safe, simple and gentle removal and transfer of plate-shaped objects, in particular information carriers, in an automated environment.

This object is achieved in an apparatus for the removal and transfer of plate-shaped objects (CD) from a stack including a suction device having means movable against a counter-force for generating a vacuum with a predetermined duration and defining a suction opening, characterized in that the vacuum generating means includes U-shaped hollow elements each having an opened end arranged concentrically that are slideable towards and into one another with their open ends and are substantially airtightly sealed in their movement range in relation to one another to the extent that when a vacuum is generated a leak flow of predetermined size and course is produced for a predetermined duration sufficient for the removal and transfer of the plate-shaped object (CD).

Advantageously, the two hollow elements have in their movement area guides with fitting dimensions matched to one another such that an air gap can be generated which is necessary for predetermining the leak flow, and/or an elastic sealing means is provided between the two hollow elements in the movement range, by which the leak flow can be determined.

In a further advantageous modification of the invention, the two hollow elements are designed as lower and upper parts of a cylindrical ring case, and a lower side of the lower hollow element facing the upper side of the stack has two sealing lip rings concentrically arranged around the central axis of the hollow elements, between which rings several suction openings are arranged.

In accordance with yet another advantage of the invention the apparatus includes a receiving device arranged underneath the plate-shaped object picked up by the suction device and is connected thereto, and in that the receiving device has two holding elements pivotable into the area of the object and intended for precisely-positioned pickup of the plate-shaped object released by the suction device and for transferring it into a processing station.

Apparatus in accordance with this invention further includes a sensor device for detecting a topmost plate-shaped object (CD), the movable means including scanning marks arranged in a vertical alignment, parallel to the stack, and a sensor stationarily disposed in relation to the movable means for detecting the scanning marks, to determine when a topmost plate-shaped object (CD) is picked up from the stack.

Further advantages and features of the invention can be inferred from the description of an embodiment of the invention shown in the drawings.

BRIEF DESCRIPTION OF THE DRAWINGS

FIG. 2C is the suction device according to FIG. 2A in a transfer position with a picked-up plate-shaped object.

DETAILED DESCRIPTION OF THE INVENTION

Figure 1:
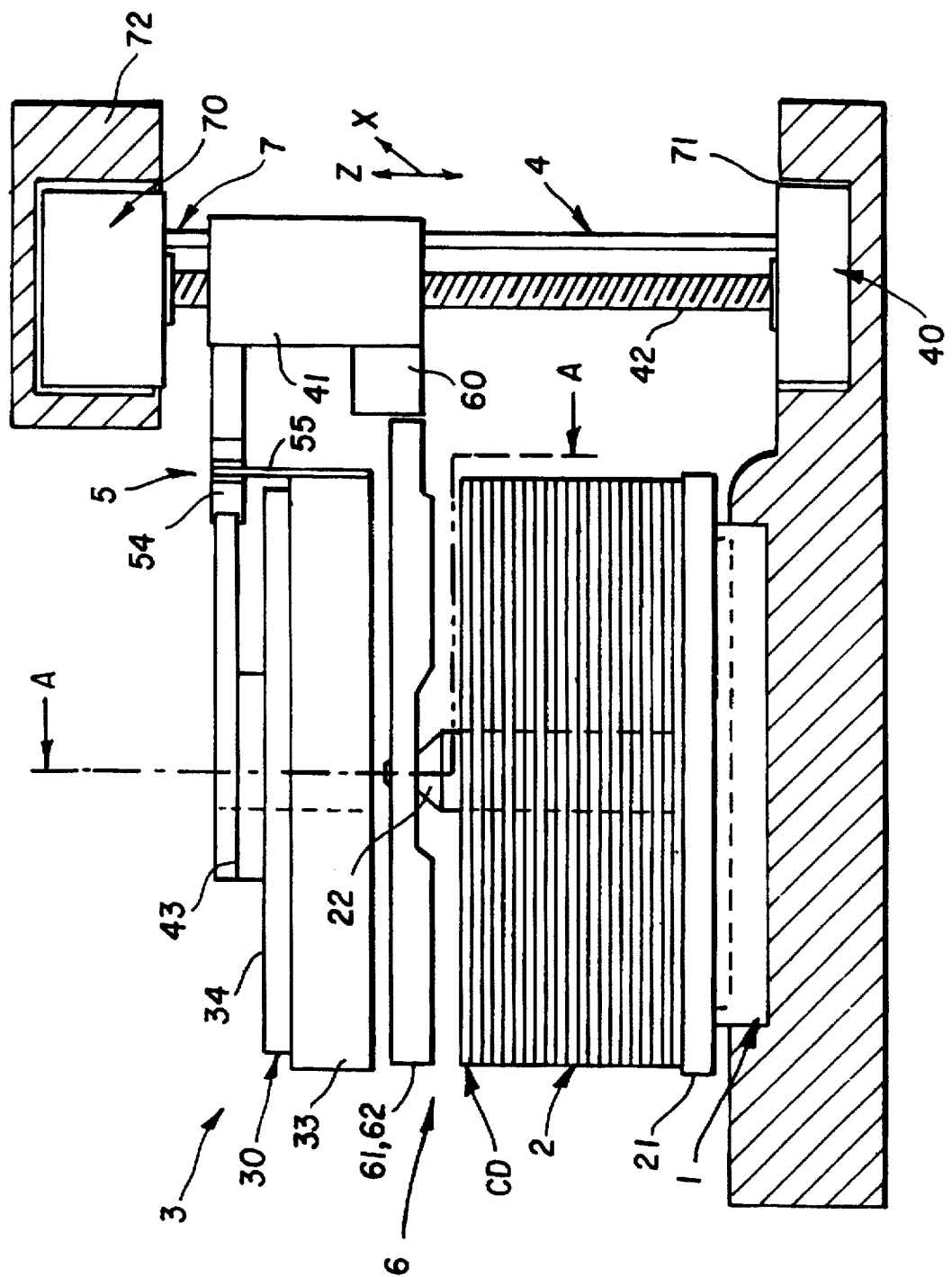
FIG. 1 is an apparatus in accordance with the invention in a view without housing and partially in section.

The following description relates to an apparatus for the removal and transfer of a plate-shaped object from a stack in which the plate-shaped object is preferably designed as an information carrier in the form of a compact disk (CD). It is evident to a person skilled in the art that the apparatus in accordance with the invention can also be used for removal and transfer of other stacked plate-shaped objects having a smooth and flat surface (e.g. ring discs) or information carriers (e.g. floppy disks, diskettes or records).

The apparatus shown in FIG. 1 for the removal and transfer of plate-shaped objects, in the following referred to as compact disks (CDs), is shown in an initial position with an inserted CD stack.

The apparatus comprises a magazine support 1, which for example is arranged inside a replay/recording unit (not shown) for CDs, a stack magazine 2 placed thereon in a recessed part, exchangeable in a known manner and having CDs stacked one above the other, a suction device 3 in the area above the stack magazine for gripping a single CD, a lifting device 4 for the suction device, a sensor device 5 arranged in the vicinity of the suction device 3 and on the lifting device 4 for detecting a topmost CD of the stack, a receiving device 6 for a CD picked up by the suction device, and a transfer device 7.

The stack magazine 2 comprises a horizontally aligned base plate 21 with a slightly larger diameter than the compact disk CD and a preferably cylindrical shaft 22 in vertical alignment arranged in the central axis of the base plate, the shaft passing through the central openings 0 of the compact disks CD and hence assuring the holding and alignment of the stack in the vertical direction.

The shaft 22 has at its top end an upward tapering area 23 for easier receiving of the CD stack, said area having the form of a cone ending at the top in a cylindrical end piece 24 with a thread used for attachment of a protective cover, not shown.

The suction device 3 shown in FIGS. 1 and 2A to 2C has a means 30 movable against a counter-force for generation of a negative pressure (dp) or vacuum at one suction opening 32 at least on a side of the means facing the top compact disk CD on the stack. The means 30 has two U-shaped hollow elements 33 and 34 in a concentric arrangement that are slideable towards and into one another with their open ends and are substantially airtightly sealed in theft movement range in relation to one another to the extent that when a vacuum (dp) is generated a leak flow (V) of predetermined size and course is achievable, and hence also the vacuum duration predetermined for the removal and transfer of the topmost compact disk CD of the stack. The two hollow elements 33, 34 are designed as annular, cylindrical lower parts 33 and upper parts 34 that together form a ring case 30.

A compression spring 31 is provided in a concentric arrangement inside the ring case and between the two hollow elements 33, 34, so that the latter are movable in the vertical direction and along their common central axis away from one another as far as a stroke limiter 36 provided on a side wall on the inner diameter of the lower part 33.

In a further embodiment, not shown, without compression spring 31, the lower part 33 has a dead weight by which the counter-force can be generated.

The two hollow elements 33, 34 have on their inner and outer side walls guides in the movement area 35, in which guides an elastic sealing means in the form of sealing rings 37 is arranged between the two hollow elements, by which the leak flow can be predetermined.

In a further embodiment, not shown, the two hollow elements 33, 34 have in their movement area 35 guides with fitting dimensions matched to one another such that an air gap (h) can be generated by which the leak flow can be predetermined.

The air gap (h) is here in a range between 0.15 and 0.35 ram, and the air gap is determined by the mathematical relationships set forth below:

Due to the relatively large diameter of the cylinder, an approximation of the air flow characteristics to a flow between two plane-parallel plates (with I, b and h) can be assumed.

The low differential pressure allows the air flow to be assumed as incompressible. The characteristic taken as the basis is called the Poiseuille flow.

According to Hütte, in "Fundamental Principles of the Science of Engineering", 29th edition, Springer Verlag, p. E134 (68):

1.) $dp = p/2 * um^2 * I/h * 24/Re$

2.) $Re = um*h/vr$

3.) $dp = p/2 * um*24*I* vr/h^2$

4.) $V = V1+V2$

5.) $dp = m*g/A$

6.) $A = (R2^2 - R1^2)*n$

7.) $Vi = dp/12 * 2Ri*n*hi^3/(1i* vr*p)$

8.) $t = s*A/V$

Dependence of the lifting time on the lifting cylinder geometry:

9.) $t = 6*s*A^2\eta/(n*m*g* (R1*h1^3/I1+R2*h2^3/I2))$
with $=(R2^2-R1^2) * n$ wherein:

h=air gap width h1=air gap width of inner guide h2=air gap width of outer guide

V1=volume flow through inner air gap

V2=volume flow through outer air gap dp=differential pressure m=weight of lower cylinder+weight of CD Ri=radii of air gaps, in each case the larger R1=outer radius of inner guide R2=outer radius of outer guide I1=wall thickness at outer radius of inner cylinder I2=wall thickness at inner radius of inner cylinder I=plate length b=plate width vr=friction force s=guide length A=effective surface p=air density $\eta$=dynamic viscosity of air $=17*10-6Pa * s$ Re=Reynolds number (inertia force from friction for ce)

um=average speed of air flow t=time for movement of inner cylinder along distance s n=Pi (3.14)

On the lower side of the lower hollow element 33 facing the top of the stack, two sealing lip rings 38 are provided around the central axis of the hollow elements 33, 34 in a concentric arrangement in the vicinity of the inner and outer edge, between which several suction openings 32 are arranged.

A total leak flow can be predetermined by means of a first partial leak flow—the leak flow predetermined between the hollow elements—and a second predetermined partial leak flow present between the sealing lips of the suction openings and the surface of the compact disk CD.

An automatic one-way valve 39 for bleeding the ring case 30 and for generating the suction vacuum when the ring case contacts the stack is arranged on the upper hollow element 34.

The ring case and the lower annular hollow element 33, respectively, has an opening with an inner diameter adjusted to the outer diameter of the cylindrical shaft 22 of the stack magazine 2.

The upper hollow element 34 of the ring case 30 is attached by a holder 43 to the lifting device 4 which is movable in a known manner by a microprocessor-controlled drive unit 40 up and down in a Z direction above the stack for removal of the topmost compact disk CD from a stack and horizontally in an X direction for transfer of the picked up CD to a processing station not shown (such as a transfer station or replay/recording drive) by the transfer device. The lifting device arranged on the side of the stack magazine 2 has in addition a generally known spindle drive 41 with a slide 42 movable in the Z direction. The transfer device 7 for conveying the lifting device 4 in the X direction has a generally known microprocessor-controlled drive unit 70, shown only in diagrammatic form, and lower guide rails 71 and upper guide rails 72.

As shown in FIGS. 1 and 2A to 2C, the receiving device 6 is arranged underneath the compact disk CD picked up by the suction device 3 and is connected to a holder of the suction device, i.e. to the slide 41 of the lifting device 4, and the receiving device 6 has two holding elements 61 and 62 pivotable into this area and intended for precisely-positioned pickup of the CD released by the suction device and for transferring it into the processing station.

Figure 2A:
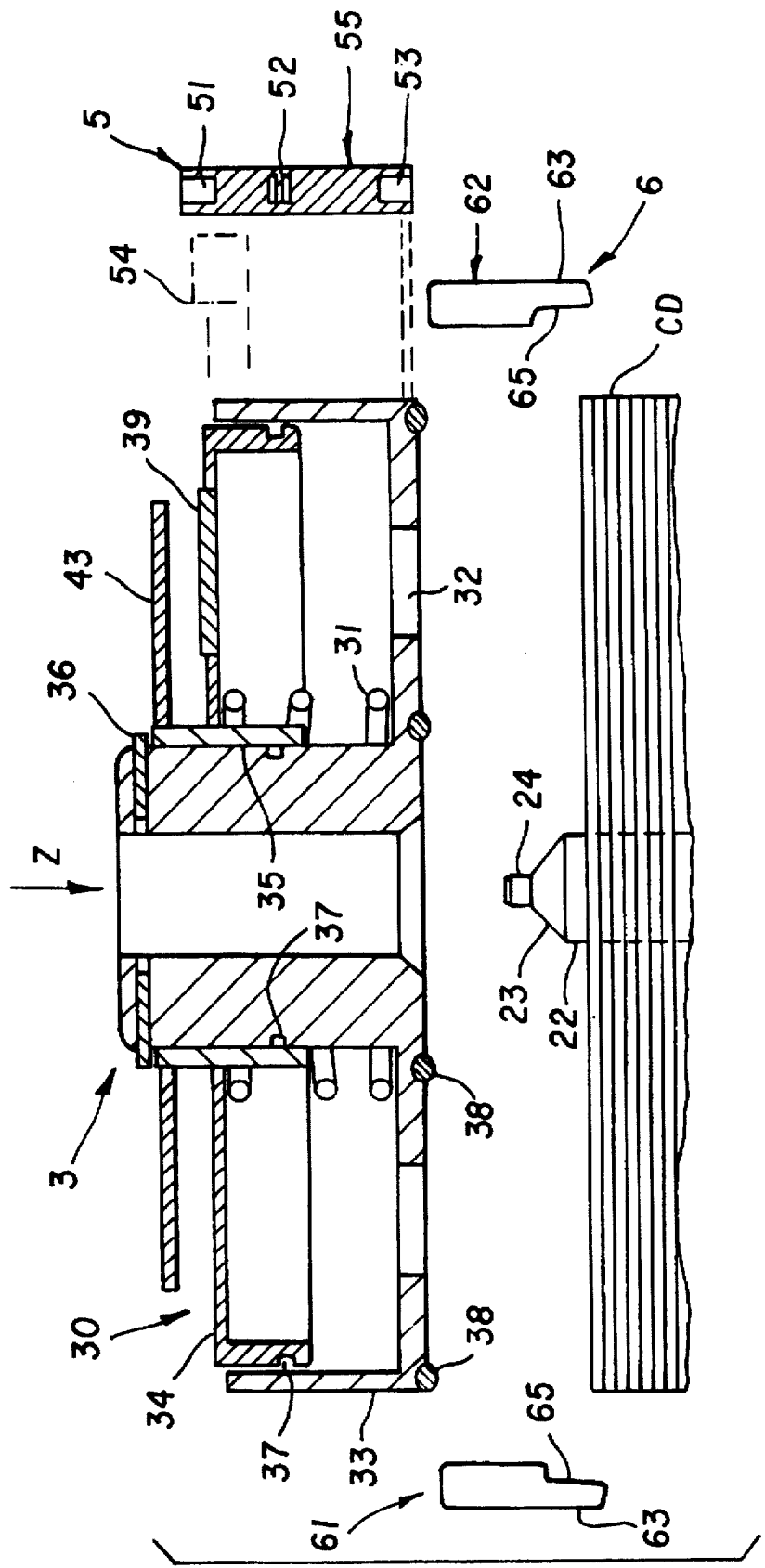
FIG. 2A is a suction device, receiving device and sensor device of the apparatus according to FIG. 1 in a partial view along a section line "A—A" in an upper starting position.
Figure 2B:
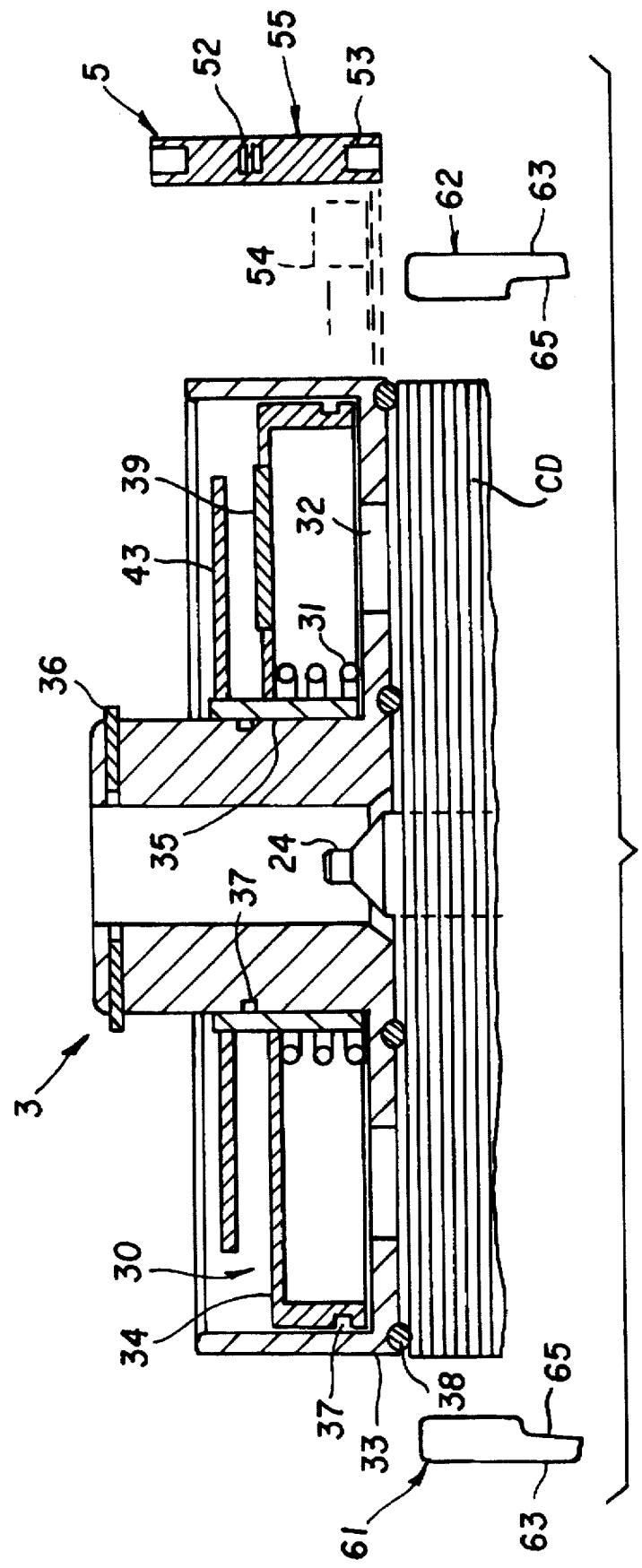
FIG. 2B is the suction device according to FIG. 2A in a removal position for removal of a plate-shaped object from a stack.
Figure 3:
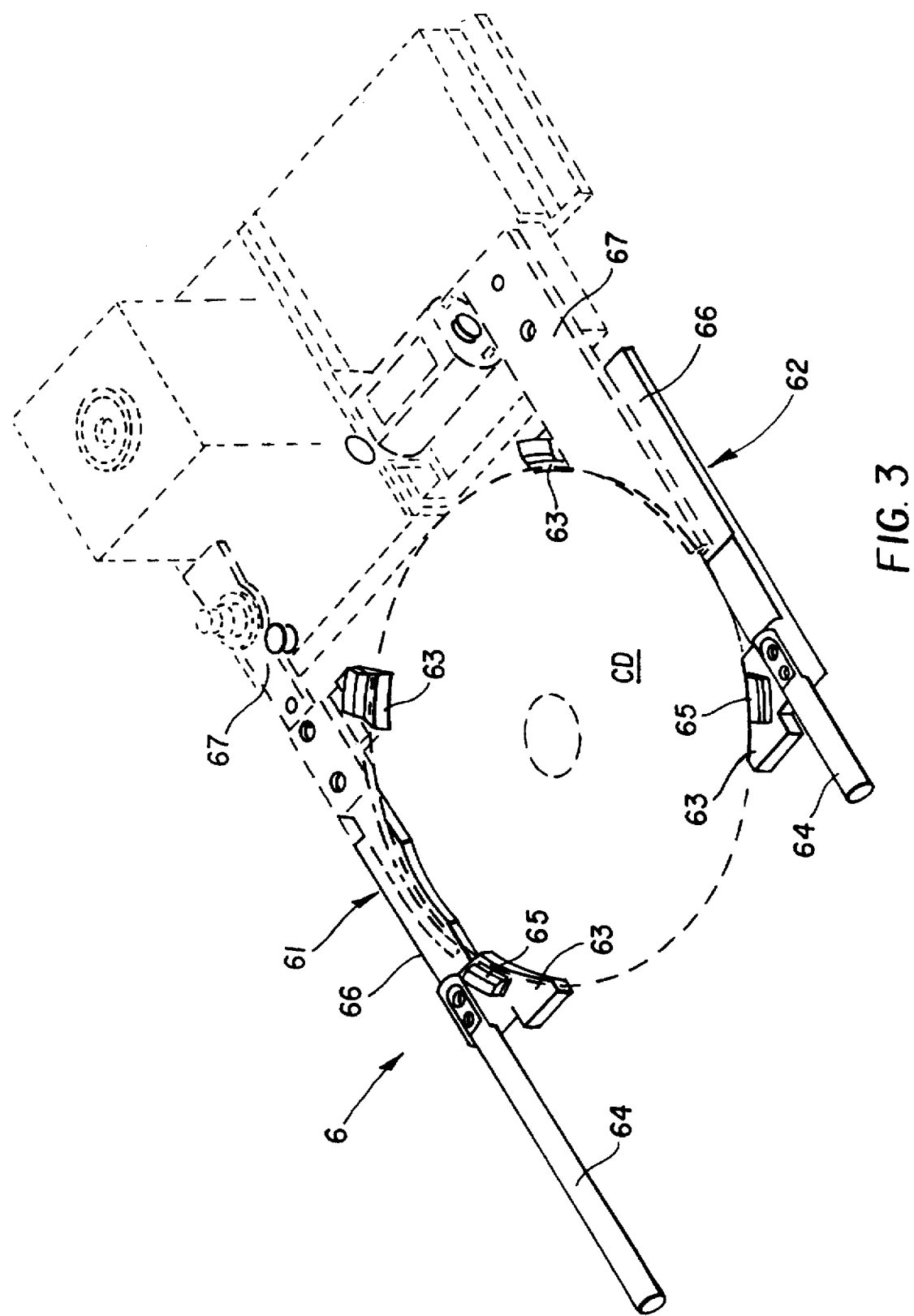
FIG. 3 is holding elements of the receiving device for a gripped plate-shaped object in detail.

The holding elements 61, 62 are here attached in a parallel and diametrically opposite arrangement to a microprocessor-controlled drive unit 60 such that the CD stack of the stack magazine 2 is between the downward-suspended extensions 63 of the holding elements in a starting position, as per FIGS. 1, 2A and 2B.

In the receiving position shown in FIG. 2C, the holding elements 61, 62 with their extensions 63 are rotated about their longitudinal central line by the drive unit 60 90° inwards and upwards, or radially to the central axis of the CD stack, so that the extensions 63 are immediately (approx. 1–2 mm) underneath and in the area of the outer edge of the picked up and lifted compact disk CD in a horizontal alignment.

The holding elements 61, 62 shown in FIGS. 1, 2A to 2C and 3 have on the one side rotary axis sections 64 and on the other side recesses 65 for pickup of the CD matched to the outer circumference of the CD on the surface of the extension 63. The recesses 65 are here provided on their outer edges with insertion bevels for centering the CD released by the suction device 3.

The extensions 63 have in the area of the recesses 65 cutouts 66 for gripper arms 67 of a transfer station (not shown) for removal of the CD.

The sensor device 5 shown in FIGS. 1, 2A to 2C has scanning marks 51, 52, 53 on the moving means (30), i.e. on the lower hollow element 33 of the suction device 3 in a vertical alignment, parallel to the CD stack, and a sensor 54 stationary in relation to the moving means on the upper hollow element 34 (or holder 43) of the suction device 3 for detecting the scanning marks, such that a topmost compact disk CD, a picked up CD and/or a lifted CD, is detectable.

The scanning marks are spaced in the vertical direction and designed such that different heights of the suction device 3 or ring case are detectable when the hollow elements 33, 34 are slid into one another during the various phases of CD removal.

The scanning marks 51 and 53 are arranged on an upper and a lower end of a mark carrier 55 in the form of a preferably square color mark or punched hole, and the scanning mark 52 is in the middle area in the form of two preferably rectangular color marks or punched holes arranged one immediately above the other.

The sensor 54 is preferably designed as an opto-electronic reflected light or forked light barrier whose signal output is connected in a known manner to a microprocessor-controlled unit control device for signal evaluation.

The mode of operation of the apparatus is as follows:

First a stack magazine 2 completely filled with compact disks CD is adjusted for precise positioning of the CD stack in the direction against the lifting device 4 in the recessed part of the magazine carrier 1. The suction device 3 is here in the upper starting position shown in FIGS. 1 and 2A.

The suction device 3 is then moved downwards in the Z direction by the lifting device 4 until the lower hollow element 33 of the ring case 30 is resting on the topmost compact disk CD of the stack with its opening above the shaft 22 of the stack magazine 2, and the upper hollow element 34 is inserted fully into the lower hollow element 33 against the spring force of the compression spring 31 in accordance with FIG. 2B. The excessive pressure resulting from the reduction of the cavity between the hollow elements is reduced through the one-way valve 39. The sensor 54 of the sensor device 5 is moved during this downward movement from the top scanning mark 51 via the center scanning marks 52 to the lower scanning mark 53, and the drive unit 40 of the lifting device 4 is stopped when this lower scanning mark 53 is reached.

After a brief period of time used for pressure compensation in the ring case and for a tight contact of the lip sealing rings 38 on the surface of the CD, the lifting device, i.e. its slide 42, is moved back in the direction of the upper starting position shown in FIG. 2C.

When the ring case 30 is lifted by the lifting device 4, the dead weight or the weight of the lower hollow element 33 and the spring force or counter-force of the compression spring 31 generate a vacuum or suction force sufficient for picking up the CD and lifting it. The topmost CD of the stack, the surface of which forms together with the two hollow elements 33, 34 a closed-off air volume that increases only by the leak flow and the resultant compensatory movement between the two hollow elements, is hence lifted from the stack.

The lifting device 4 now moves the suction device 3 with the CD in the direction of a set-down point for the CD, the top starting position (in accordance with FIG. 2C), but waits in an intermediate or waiting position, not shown, until about 30–60% of the maximum relative movement between the two hollow elements has been completed and until any second CD that might have been lifted too by adhesion or electrostatic charge has dropped back onto the stack.

The relative position determining the leaving of the waiting position and the movement of the lifting device 4 to the set-down point is fixed by the center scanning marks 52 of the sensor device 5. This always provides enough time (duration of relative movement between the scanning marks 52 and 51 ) in which the vacuum can still hold the CD to get from the waiting position to the set-down point.

The pivoting in of the holding elements 61, 62 or of the extensions 63 of the receiving device 6 takes place after the suction device with the picked-up CD has left the waiting position and before the upper starting position or set-down point has been reached.

After a time predetermined by the intentional and predetermined leak flow between the hollow elements 33, 34 of the suction device 3, the CD drops into the recesses 65 of the two extensions 63 and is precisely positioned inside the receiving device.

After the suction device 3 in conjunction with the receiving device 6 has reached the top starting position above the CD stack, it is conveyed together with the lifting device 4 by the transfer device 7 in the horizontal X direction to the transfer station, not shown, where the CD is removed by gripper arms of the gripper device provided there from the receiving device 6 and conveyed to, for example, a replay/recording station, not shown, or to a permanently installed magazine with receptacles for CDs and set down there. The upper starting position of the lifting device is here recognized in known manner by a sensor device, not shown, and/or a step counting device (in conjunction with a stepping motor of the drive unit).

Then the suction device 3, the receiving device 6 and the lifting device 4 are returned by the transfer device 7 back to the starting position as per FIGS. 1 and 2A, and the extensions 63 or holding elements 61 and 62 of the receiving device 6 are pivoted downwards and out of the area of the CD stack.

This operation is repeated until all CDs have been removed from the stack magazine 2, or after the emptied stack magazine has been exchanged for a filled or part-filled new one and the program sequence has been restarted.

The invention has been described in detail with particular reference to certain preferred embodiments thereof, but it will be understood that variations and modifications can be effected within the spirit and scope of the invention.

Parts List 1 magazine support
2 stack magazine
3 suction device
4 lifting device
5 sensor device
6 receiving device
7 transfer device
21 base plate
22 shaft
23 tapering area
24 end piece
30 movable means
30 ring case
31 compression spring
32 suction opening
33 hollow element
34 hollow element
35 movement area
37 sealing rings
38 lip sealing rings
39 one-way valve
40 drive unit
41 spindle drive
42 slide
43 holder
51 scanning mark
52 scanning mark
53 scanning mark
54 sensor Parts List cont'd 60 drive unit
61 holding dement
62 holding element
63 extensions
64 axis sections
65 side recesses
66 cutouts
67 gripper arms
70 drive unit
71 upper guide rails
72 lower guide rails

I claim:

1. Apparatus for the removal and transfer of plate-shaped objects (CD) from a stack including a suction device having means movable against a counter-force for generating a vacuum with a predetermined duration and defining a suction opening, characterized in that said vacuum generating means includes U-shaped hollow elements each having an open end that are slideable towards and into one another with their open ends and are substantially airtightly sealed in their movement range in relation to one another to the extent that when a vacuum is generated a leak flow of predetermined size and course is produced for a predetermined duration sufficient for the removal and transfer of said plate-shaped object (CD).

2. Apparatus according to claim 1, characterized in that said two hollow elements have in their movement range guides with fitting dimensions matched to one another such that an air gap produces a predetermined leak flow.

3. Apparatus according to claim 1, characterized in that an elastic sealing means is provided between said two hollow elements in said movement range, which produces a predetermined leak flow.

4. Apparatus according to claim 1, characterized in that a sealing lip is provided on said suction opening so that a total leak flow can be predetermined by a first partial leak flow—the leak flow predetermined between the hollow elements—and a second predetermined partial leak flow present between the sealing lip of said suction opening and a surface of said plate-shaped object (CD).

5. Apparatus according to claim 1, characterized in that said plate-shaped object (CD) is designed as an information carrier in the form of a compact disk (CD) or floppy disk.

6. Apparatus according to claim 1, wherein said two hollow elements form a cylindrical ring case, and said hollow elements forming lower and upper parts of the cylindrical ring case, and in that the lower part has a dead weight by which the counter-force is produced.

7. Apparatus according to claim 6, characterized in that a compression spring for generating the counter-force and a stroke limiter is provided between said two hollow elements.

8. Apparatus according to claim 6, characterized in that two sealing lip rings concentrically arranged around said hollow elements are provided on the lower side of one of said hollow elements, between which rings one or more suction openings are arranged.

9. Apparatus according to claim 6, characterized in that said ring case has an opening with an inner diameter adjusted to the outer diameter of a cylindrical shaft vertically arranged on an exchangeable stack magazine, said shaft serving to receive said plate-shaped objects (CD) stacked one above the other through their central openings.

10. Apparatus according to claim 9, further including a microprocessor-control drive unit, a lifting device which is movable by the microprocessor-controlled drive unit up and down in a Z direction above the stack and a transfer device for transfer of the picked-up object (CD) horizontally in an X direction.

11. Apparatus according to claim 10, characterized in that a sensor device for detecting a topmost object (CD) of the stack is arranged in the area of said suction device and on said lifting device.

12. Apparatus according to claim 11, further including a sensor device for detecting a topmost plate-shaped object (CD), said movable means including scanning marks arranged in a vertical alignment, parallel to the stack, and a sensor stationarily disposed in relation to said movable means for detecting said scanning marks, to determine when a topmost plate-shaped object (CD) is picked up from the stack.

13. Apparatus according to claim 10, characterized in that an automatic valve for bleeding said ring case when the latter contacts the stack is arranged on one of said hollow elements.

14. Apparatus according to claim 10, further including a processing station characterized in that a receiving device is arranged underneath said plate-shaped object (CD) picked up by said suction device and is connected to said suction device in that said receiving device has two holding elements pivotable into the area of said object and for precisely-positioned pickup of said plate-shaped object released by said suction device and for transferring the object into the processing station.

* * * * *